United States Patent [19]

Smith et al.

[11] Patent Number: 4,759,406

[45] Date of Patent: Jul. 26, 1988

[54] WIRELINE TOOL CONNECTOR WITH WELLBORE FLUID SHUTOFF VALVE

[75] Inventors: Lonnie J. Smith, Allen; Dennis R. Wood, Plano, both of Tex.

[73] Assignee: Atlantic Richfield Company, Los Angeles, Calif.

[21] Appl. No.: 18,683

[22] Filed: Feb. 25, 1987

[51] Int. Cl.[4] .......................... E21B 47/00; H02G 9/06

[52] U.S. Cl. .......................... 166/65.1; 166/325; 439/194

[58] Field of Search .................. 166/65.1, 325, 72, 385; 339/16 R, 16 C, 16 RC; 174/11 R

[56] References Cited

U.S. PATENT DOCUMENTS

| | | | |
|---|---|---|---|
| 2,765,146 | 10/1956 | Williams, Jr. | 175/324 X |
| 3,401,749 | 9/1968 | Daniel | 166/67 |
| 3,989,330 | 11/1976 | Cullen et al. | 339/16 R |
| 4,413,958 | 11/1983 | Webb | 166/325 X |
| 4,570,709 | 2/1986 | Wittrisch | 166/65.1 X |
| 4,588,243 | 5/1986 | Ramsey et al. | 166/65.1 X |
| 4,624,308 | 11/1986 | White | 166/65.1 |
| 4,706,744 | 11/1987 | Smith et al. | 166/55.1 |

*Primary Examiner*—Stephen J. Novosad
*Assistant Examiner*—Hoang C. Dang
*Attorney, Agent, or Firm*—Michael E. Martin

[57] ABSTRACT

A connector for attaching a downhole tool to the end of a tubing string insertable in a wellbore includes a one-way valve to permit flow of fluids from the tubing string into the wellbore but to prevent the flow of fluids in the opposite direction. An electrical cable extends through central passages formed in the one-way valve and a frangible coupling which will separate the connector from the tool if the tool becomes stuck in the wellbore.

7 Claims, 2 Drawing Sheets

WIRELINE TOOL CONNECTOR WITH WELLBORE FLUID SHUTOFF VALVE

BACKGROUND OF THE INVENTION

1. Field of the Invention

The present invention pertains to an improved wireline tool connector for interconnecting a downhole tool with a tubing string having an electrical conductor or wireline cable extending therethrough.

2. Background

In operations in wellbores for producing hydrocarbon fluids and other values, difficulties arise in positioning and operating certain types of downhole tools. Various types of electrically operated downhole tools such as logging sondes and perforating tools are sometimes preferably positioned in the wellbore utilizing elongated bendable metal tubing, referred to in the art as coiled or coilable tubing, having an electrical cable or wireline for transmitting signals between the tool and the surface extending through the tubing. U.S. Pat. No. 3,401,749 to W. L. Daniel describes a method and apparatus generally of the type to which this invention pertains.

However, if the coiled tubing is not properly sealed the sometimes extremely high fluid pressures existing in the wellbore will result in the flow of wellbore fluids up the tubing to the surface. Such a condition is not normally desired and can only be corrected with prior art apparatus by actuating suitable blowout preventer rams or similar devices on the wellhead to crush the tubing to shut off the flow of fluids. Such action is undesirable as it requires replacement of the tubing and may damage the electrical wireline conductors extending therethrough.

Accordingly, it has been deemed desirable to provide a connector between the tubing string and a downhole tool which will accommodate the extension of wireline signal conductors through the connector and which also will allow for the flow of well fluids down through the tubing string into the wellbore while preventing the flow of fluid in the opposite direction.

SUMMARY OF THE INVENTION

The present invention provides an improved connector apparatus for interconnecting a subsurface or so called downhole well tool with an elongated tubing string and wherein electrical conductors extend through the tubing string and the connector to the tool itself.

In accordance with one important aspect of the present invention, a downhole tubing connector is provided for interconnecting a wireline or other electrical downhole tool with a tubing string in such a way that electrical conductors extend through the connector and the connector is provided with shutoff valve means which allows for the flow of fluid through the tubing string into the wellbore but prevents flow of fluids in the opposite direction.

The invention provides for an arrangement wherein flexible electrical conductor wires extend through the shutoff valve including through a resilient seal in the shutoff valve closure member itself. The shutoff valve is advantageously spring biased into a closed position except when fluids pumped down the tubing string to the wellbore are under sufficient pressure to unseat the valve and permit flow of fluid into the wellbore itself.

The improved connector of the present invention further provides a frangible coupling which is located between the shutoff valve and the downhole tool in such a way that, in the event of separation of the coupling, the shutoff valve remains closed and connected to the tubing string to prevent wellbore fluids from flowing up-hole through the tubing string.

The improved connector further provides an arrangement wherein a seat member of the shutoff valve forms a fitting on the end of the tubing string attached to the connector which simplifies the construction of the connector shutoff valve and the connector body itself.

The abovementioned features and advantages of the present invention, together with other superior aspects thereof, are described in further detail herein. These features and advantages will be further appreciated by those skilled in the art upon reading the detailed description which follows in conjunction with the drawing.

BRIEF DESCRIPTION OF THE DRAWING

FIG. 1 is a view illustrating the use of the connector of the present invention for supporting a downhole well tool at the end of a tubing string or the like.

DESCRIPTION OF A PREFERRED EMBODIMENT

Figure 1:
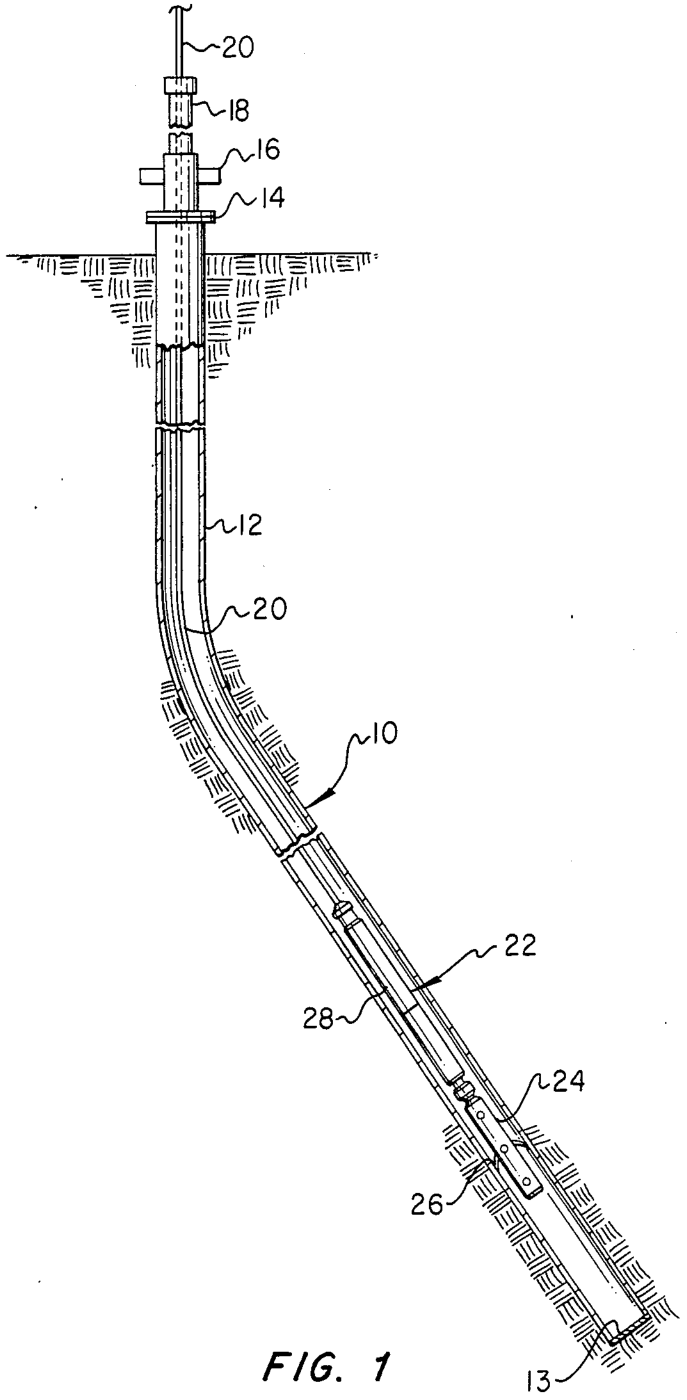

In the description which follows, like parts are marked throughout the specification and drawing with the same reference numerals, respectively. The drawing figures are not necessarily to scale and certain features of the invention may be shown exaggerated in scale in the interest of clarity and conciseness.

Referring to FIG. 1, there is illustrated a typical deviated wellbore, generally designated by the numeral 10, which is provided with a casing 12. In the illustrated example of the wellbore 10 the casing 12 extends to the bottom 13 of the wellbore although the wellbore may include an open or uncased lower portion. The casing 12 extends to a wellhead 14 which may be provided with a conventional blowout preventer 16 and a wireline lubricator 18. An elongated tubing string 20 extends through the lubricator 18 and into the wellbore and terminates at its lower end in a connector in accordance with the present invention and generally designated by the numeral 22.

The connector 22 interconnects the tubing string 20 with a tool 24 which may be a conventional casing perforating gun, a logging sonde, or other type of subsurface or downhole tool. The tool 24 may include centering means 26 of conventional construction for centering the tool in the wellbore. The connector 22 includes an upper body member 28 which is coupled directly to the tubing string 20 and may be journaled in the wellbore by a centralizer, not shown.

The tubing string 20 may comprise an elongated section of bendable metal tubing which extends from the connector 22 through the wireline lubricator 18 and may be operated to be injected into and removed from the well 10 by a suitable coiled tubing injection unit, not shown, of a type disclosed in U.S. Pat. No. 4,685,516 issued Aug. 11, 1987, and assigned to the assignee of the present invention, or of a type disclosed in U.S. Pat. No. 3,401,749. The tubing string 20 may also be made up of end to end coupled tube sections and is not required to be constructed of metal since certain plastic materials or non-metallic composites may also be used as the structural material for the tubing string.

Figure 2:
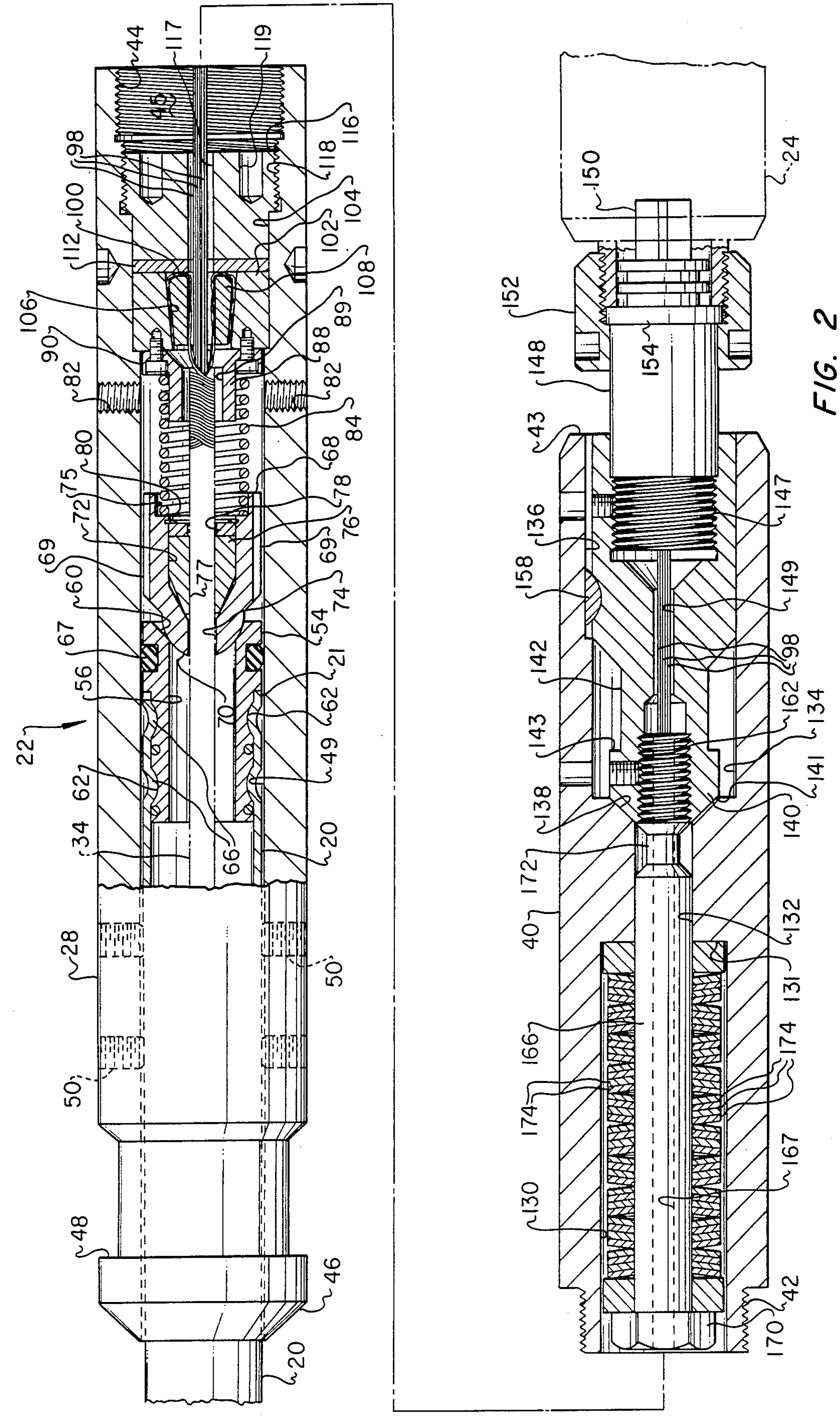
FIG. 2 is a longitudinal central section view of the connector.

Referring to FIG. 2, the tubing string 20 includes an elongated electrical cable extending therethrough and generally designated by the numeral 34. The cable 34 is adapted to be connected to a suitable control apparatus, not shown, similar to the arrangement described in U.S. Pat. No. 3,401,749, on the surface, and extending through the tubing string 20 and the connector 22 to the tool 24. The connector 22 includes a lower body member 40 which is adapted to be removably connected to the upper body member 28 by a reduced diameter threaded portion 42 which is operable to be threadedly inserted in an internally threaded bore 44 formed in the body member 28. The terms upper and lower mentioned herein are for convenience only and refer to the relative locations of the respective members so designated when the connector 22 is inserted in a generally vertically extending wellbore. The upper end of the connector body 28 includes a fishing neck comprising a generally conical surface 46 and an annular transverse shoulder 48 whereby, in the unlikely event that the connector is separated from the tubing string 20, a fishing tool may be lowered into the wellbore to engage the body member 28.

The body member 28 is an elongated generally cylindrical member having a bore 49 extending therethrough and adapted to receive the lower end 21 of the tubing string 20. The tubing string 20 is typically secured to the body member 28 by a plurality of axially spaced apart radially extending setscrews 50 which are threadedly engaged with the body member 28 and forcibly engage the tubing end portion 21. The very distal end of the tubing portion 21 is coupled to one member of a shutoff valve comprising a valve seat 54 having a longitudinal fluid passage or bore 56 formed therein. The seat member 54 includes a valve seat surface 60 of somewhat spherical or frustoconical shape. The seat member 54 also includes spaced apart annular recesses or grooves 62 for receiving radially inwardly displaced portions 66 of the tubing end whereby the tubing string 20 is secured to the seat member 54. A fluid seal is formed by an o-ring 67 disposed in a suitable annular groove formed in the seat member 54 and engageable with the wall defining the bore 49 in the body member 28. The seat member 54 may be replaced, if needed, by cutting the tubing end portion 21 at a suitable point for removal of the seat member followed by attachment of a new seat member to the tubing end and reconnecting the tubing 20 to the body member 28.

The shutoff valve for the connector 22 also includes a one-way valve closure member 68 having a generally hemispherical head portion 70 and a partially frustoconical shaped central passage 72. The closure member 68 includes a longitudinal bore 74 formed in the head 70 and opening into the passage 72. The bore 72 is adapted to receive suitable packing or seal means comprising a member 76 disposed in the bore 72 and retained therein by a support ring or washer 78 and a removable retaining ring 80. The seal member 76 may be formed of a suitable resilient material such as molded polyurethane and includes a bore 77 formed therein which is adapted to be aligned with the bore 74 formed in the closure member 68.

The closure member 68 includes generally radially extending, circumferentially spaced apart guides 69, two shown in FIG. 2, for guiding the closure member for axial movement in the bore 49 while permitting the flow of fluids from the bore 56 past the closure member and out of the connector body 28 through a plurality of threaded passages 82, two shown in FIG. 2. The closure member 68 is biased into engagement with the valve seat member 54 by a coil spring 84 which has one end disposed in a recess 75 formed in the closure member 68 and the other end guided on a projection 88 formed on a removable retainer plate 90, also adapted to be disposed in the bore 49.

As illustrated in FIG. 2, the cable 34 extends through the tubing end 21, the bore 74 and the bore 77 formed in the seal member 76. The cable 34 may be a conventional multiple conductor cable, also commonly known as a wireline cable, having a plurality of insulated electrical conductors 98 disposed in a sheath which may include plural layers of wound or braided steel wire 100 or other suitable elongated filaments. The cable 34 extends through a bore 89 formed in the retainer member 88 and is anchored in the body member 28 by means comprising a generally cylindrical anchor body 102 which is disposed in an enlarged bore portion 104 coaxial with the bore 49. The anchor body 102 includes a generally frustoconical central bore 106 which is adapted to receive a frustoconical shaped anchor plug 108. The plug 108 includes a suitable central bore 110 formed therein through which the conductors 98 and unwound sheath wires 100 are extended.

The cable sheath wires 100 are preferably bent over and trapped between the exterior surface of the anchor plug 108 and the anchor body 102 and retained therein by a cylindrical retainer plate 112 which is forcibly engageable with the sheath wires and the anchor plug to force the plug ever tighter into the bore to clamp the wires as illustrated.

The retainer plate 112, the anchor body 102 and the anchor plug 108 are secured in assembly and in the bore 104 by a retaining plug 116 which is threadedly engaged with an internally threaded portion 118 of the connector body 28. The plug 116 may include suitable recesses 119 for receiving the lugs of a spanner wrench, not shown, for securing the plug in the connector body 28, as illustrated. The plug 116 also includes a central bore 117 through which the conductors 98 may extend to the lower connector body 40.

The connector body member 40 includes a first longitudinal bore 130 extending from the threaded portion 42, a reduced diameter bore 132 and an enlarged bore portion 134 which extends from the bore 132 to the opposite end of the lower connector body 40. A longitudinal keyway 136 extends partially into the bore 134 from the end 43 of the body 40 opposite the threaded portion 42. A somewhat frustoconical shaped surface 138 is interposed between the bores 132 and 134 for seating a fishing head 140 of a coupling member 142. The head 140 includes a conical surface 141 and a transverse annular shoulder 143 for engagement with a suitable fishing tool, not shown, to retrieve the coupling member 142 and the tool 24 connected thereto. The coupling member 142 includes an internally threaded portion 147 for receiving a cable connector body 148 threadedly engaged therewith.

The cable connector body 148 includes a suitable multiconductor plug 150 which is adapted to couple the conductors 98 electrically to suitable signal transmitting or receiving apparatus, not shown, within the tool 24. The cable connector body 148 is threadedly coupled to the tool 24 by a nut 152 which is retained on the body 148 by an annular shoulder 154. Accordingly, the conductors 98 may extend through a bore 149 in the coupling member 142, into and through the cable connector body 148 and be suitably terminated at the plug 150. The coupling member 142 includes a suitable keyseat for receiving a Woodruff key 158 which is also disposed in the keyway 136. The arrangement of the key 158 interconnecting the coupling member 142 with the connector body 40 prevents rotation of the coupling member 142 relative to the connector body 40 which may be of importance in rotationally orienting certain downhole tools connected to the tubing string 20, for example. Moreover, unrestrained rotation of the connector body 148 relative to the connector 22 could damage the conductors 98.

The coupling member 142 is part of a frangible coupling interconnecting the connector 22 with the tool 24 and is also described and claimed in U.S. Pat. No. 4,706,744 issued Nov. 17, 1987, and assigned to the assignee of the present invention. The head 140 is provided with an internally threaded passage 162 for receiving a threaded end portion of an elongated coupling pin 166. The coupling pin 166 includes a reduced diameter portion 172 having a predetermined cross-sectional area which will cause the pin 166 to separate in response to a predetermined tension load being exerted on the connector 22 by the tubing string 20, for example. The pin 166 includes a longitudinal bore 167 extending therethrough for passage of the conductors 98. The pin 166 is slidable in the bore 132 and closely fitted therein and is retained in the body 40 by resilient means comprising a plurality of stacked conical spring washers 174, sometimes referred to as Belleville washers, interposed between the pinhead 170 and a transverse surface 131 delimiting the bore 130. The spring washers 174 are preloaded to a predetermined degree upon assembly of the pin 166 to the coupling member 142 to minimize unwanted axial excursions of the tool 24 relative to the connector 22.

Axial movement of the assembly of the tool 24, the body 148, the coupling member 142 and the pin 166 may occur away from to the body member 28 and the tubing string 20 for absorbing any sudden axial loads such as might occur in response to axial recoil forces resulting from detonation of wellbore perforation charges and the like. Moreover, in the event that the tool 24 should become stuck in the wellbore, and upon exercise of a sufficient upward pulling force on the tubing string 20, the pin 166 will separate whereby the connector body 40 will separate from the coupling member 142 and that portion of the connector comprising the body members 28 and 40 will be retrieved from the wellbore leaving the fishing head 140 exposed for engagement with a suitable fishing tool.

Typically, the cable 34 is provided with enough slack between the valve closure member 68 and the wellhead 14 to permit movement of the closure member away from the seat surface 60. Alternatively, the seat member 76 may slide back and forth along the cable 34 during movement of the closure member 68 between open and closed positions.

Separation of the connector 22 as described above will typically result in parting of the conductors 98 at some point between the anchor body 102 and the connector body 148. This relatively short length of exposed, relatively small diameter and flexible conductors 98 will generally not interfere with manuevering a fishing tool into engagement with the head 140 so that the coupling member 142 and the tool 24 can be retrieved by conventional fishing techniques. The so-called weak point formed in the connector 22 by the aforementioned frangible coupling is adapted to separate at an axial force lower than would cause separation of the tubing string 20 and the wireline cable sheath. Accordingly, in the event that the tool 24 becomes stuck in the wellbore, the tubing string 20 and a major portion of the connector 22 may be retrieved to permit insertion of a fishing tool for engagement with the coupling member 142. The shutoff valve closure member 68 will remain engaged with the seat 54 to prevent flow of fluids from the wellbore up through the tubing string 20. In the relatively unlikely event that the tubing string 20 should separate from the connector body 28, the fishing head 46 is also operable to retrieve the connector 22 and the tool 24.

The separable body members 28 and 40 also provide for ease of assembly of the connector body 28 to the wireline cable 34 for anchoring the cable in the connector body and relieving any axial strain on the conductors 98. A loop should be provided in the conductors 98 and housed in the space 45 of the body member 28 to permit assembly of the body members 28 and 40 without stressing the conductors. The retainer plug 116 and the valve closure member 68 may be easily removed for servicing and repair and the anchoring means formed by the body 102 and the plug 108 may also be easily accessed for initially anchoring the cable 34 to the connector 22.

The abovedescribed connector 22 is advantageously arranged to permit extension of the electrical conductors 98 through the connector while still providing a one way fluid shutoff valve and a frangible coupling between the tool 24 and the tubing string. The operation of the connector 22 is believed to be readily understandable to those skilled in the art from the foregoing description of its structural features. Conventional engineering metals and elastomeric materials may be used in constructing the connector 22.

Fluids may be pumped down through the tubing string 20 to unseat the closure member 68 whereby fluid may enter the wellbore through passage means provided between the bore 56 and the passages 82 so that fluid may enter the wellbore. One or more of the passages 82 may be plugged if desired by threading suitable setscrews or the like, not shown, into the passages.

Although a preferred embodiment of the invention has been described in detail herein, those skilled in the art will recognize that various substitutions and modifications may be made to the specific embodiment disclosed without departing from the scope and spirit of the invention as recited in the appended claims.

What we claim is:

1. A connector for interconnecting a downhole tool adapted to be disposed in a wellbore with an elongated tubing string, said tubing string including elongated signal transmitting conductor means extending therein for transmitting signals between said tool and the earth's surface, said connector comprising:

a body member connected at one end to said tubing string, said body member including means forming a bore through which said conductor means extends; and a fluid shutoff valve disposed in said body member and operable to permit flow of fluid from said tubing string to said wellbore in a valve open position but to prevent flow of fluid from said wellbore to said tubing string in a valve closed position, said valve including a closure member movable between said valve open and closed positions and responsive to fluid pressure in said tubing string to open to admit fluid from said tubing string to said wellbore, said closure member including passage means therein for receiving said conductor means for extension through said closure member and seal means on said closure member for preventing the flow of fluid through said passage means and means for urging said closure member toward said valve closed position to prevent flow of fluid from said wellbore to said tubing string.

2. The connector set forth in claim 1 including:

anchor means in said body member for anchoring a load bearing portion of said conductor means in said body member between said tool and said closure member.

3. The connector set forth in claim 1 including:

frangible coupling means interconnecting said body member and said tool and adapted to separate at a predetermined pulling effort on said tubing string to disconnect said tubing string from said tool, said closure member being disposed in a portion of said connector remaining connected to said tubing string upon separation of said coupling means.

4. The connector set forth in claim 3 including:

resilient spring means engageable with said closure member for biasing said closure member toward said valve closed position.

5. A connector for interconnecting a downhole tool adapted to be disposed in a wellbore with an elongated tubing string, said tubing string including elongated signal transmitting conductor means extending therein for transmitting signals between said tool and the earth's surface, said connector comprising:

a body member connected at one end to said tubing string, said body member including means forming a bore through which said conductor means extends; and a fluid shutoff valve disposed in said body member operable to permit flow of fluid from said tubing string to said wellbore but to prevent flow of fluid from said wellbore to said tubing string, said valve including a closure member movable between valve open and closed positions and having passage means therein for receiving said conductor means, seal means disposed on said closure member for preventing the flow of fluid through said passage means, and a seat member secured to said tubing string and disposed in a bore formed in said body member, said seat member being engaged with resilient seal means interposed between said seat member and said body member.

6. A connector for interconnecting a downhole tool adapted to be disposed in a wellbore with an elongated tubing string, said tubing string including elongated signal transmitting conductor means extending therein for transmitting signals between said tool and the earth's surface, said conductor means comprising a cable having a load bearing sheath portion and a plurality of electrical conductor wires extending within said sheath portion, said connector comprising:

a body member connected at one end to said tubing string, said body member including means forming a bore through which said conductor means extends;

a fluid shutoff valve disposed in said body member operable to permit flow of fluid from said tubing string to said wellbore but to prevent flow of fluid from said wellbore to said tubing string, said valve including a closure member movable between valve open and closed positions and having passage means therein for receiving said conductor means; and anchor means for anchoring said load bearing sheath portion of said conductor means in said body member between said tool and said closure member, said anchor means comprising a member defining a bore portion, a plug insertable in said bore portion for forcibly engaging a plurality of filaments comprising said load bearing sheath portion of said conductor means, and means engaged with said body member for retaining said plug in said bore portion.

7. A connector for interconnecting a downhole tool adapted to be disposed in a wellbore with an elongated tubing string, said tubing string including elongated signal transmitting conductor means extending therein for transmitting signals between said tool and the earth's surface, said connector comprising:

a body member connected at one end to said tubing string, said body member including means forming a bore through which said conductor means extends; and a fluid shuttoff valve disposed in said body member and operable to permit flow of fluid from said tubing string to said wellbore in a valve open position but to prevent flow of fluid from said wellbore to said tubing string in a valve closed position, said valve including a closure member movable between said valve open and closed positions and responsive to fluid pressure in said tubing string to open to admit fluid from said tubing string to said wellbore, said closure member including passage means therein for receiving said conductor means and resilient seal means disposed on said closure member and engageable with said conductor means for preventing the flow of fluid from said wellbore into said tubing string through said passage means, and means for urging said closure member toward said valve closed position to prevent flow of fluid from said wellbore to said tubing string.

* * * * *